(12) United States Patent
Jackinsky

(10) Patent No.: US 10,779,611 B2
(45) Date of Patent: Sep. 22, 2020

(54) MIDSOLE, SOLE ASSEMBLY AND FOOTWEAR FOR WALKING AND RUNNING

(71) Applicant: ReShod Walking Shoes, LLC, Beaverton, OR (US)

(72) Inventor: Carmen Jackinsky, Beaverton, OR (US)

(73) Assignee: ReShod Walking Shoes, LLC, Beaverton, OR (US)

( * ) Notice: Subject to any disclaimer, the term of this patent is extended or adjusted under 35 U.S.C. 154(b) by 107 days.

(21) Appl. No.: 15/754,274

(22) PCT Filed: Aug. 23, 2016

(86) PCT No.: PCT/US2016/048246
§ 371 (c)(1),
(2) Date: Feb. 21, 2018

(87) PCT Pub. No.: WO2017/035169
PCT Pub. Date: Mar. 2, 2017

(65) Prior Publication Data
US 2018/0242685 A1 Aug. 30, 2018

Related U.S. Application Data

(60) Provisional application No. 62/210,596, filed on Aug. 27, 2015.

(51) Int. Cl.
*A43B 13/12* (2006.01)
*A43B 7/14* (2006.01)
(Continued)

(52) U.S. Cl.
CPC ............. *A43B 13/12* (2013.01); *A43B 5/06* (2013.01); *A43B 7/144* (2013.01); *A43B 7/1465* (2013.01);
(Continued)

(58) Field of Classification Search
CPC ...... A43B 13/12; A43B 13/186; A43B 13/187; A43B 13/127; A43B 13/143; A43B 7/1465; A43B 7/144
See application file for complete search history.

(56) References Cited

U.S. PATENT DOCUMENTS 2,438,321 A * 3/1948 Maling ............... A43B 3/14
36/11
3,984,926 A * 10/1976 Calderon ............ A43B 21/32
36/37
(Continued)

FOREIGN PATENT DOCUMENTS

WO WO-2017/035169 A1 3/2017

OTHER PUBLICATIONS

Supplementary European Search Report issued in European Patent Application No. 16840001.8, dated May 6, 2019 (May 6, 2019). 7 pages.

*Primary Examiner* — Shaun R Hurley
*Assistant Examiner* — Bao-Thieu L Nguyen
(74) *Attorney, Agent, or Firm* — Mintz, Levin, Cohn, Ferris, Glovsky and Popeo, P.C.

(57) ABSTRACT

Provided herein are mid-soles, sole assemblies, footwear inserts and articles of footwear for walking and running. The midsoles include three cushioning members where the height of the midsole provides a zero drop elevation. The midsole architecture provides dynamic variable resistance that improves performance by using different densities and angles of component mid-sole members that will allow the wearer to move through a full range of motion during walking or running with muscle effort remaining constant while shifting the workload from muscles that have limited power in certain positions, to those with more explosive and endurance capabilities in those same positions.

51 Claims, 2 Drawing Sheets

(51) Int. Cl.

| | | |
|---|---|---|
| *A43B 13/14* | (2006.01) | |
| *A43B 13/18* | (2006.01) | |
| *A43B 13/20* | (2006.01) | |
| *A43B 17/14* | (2006.01) | |
| *A43B 5/06* | (2006.01) | |
| *B32B 3/26* | (2006.01) | |
| *B32B 3/30* | (2006.01) | |
| *B32B 5/18* | (2006.01) | |
| *B32B 5/32* | (2006.01) | |
| *B32B 7/02* | (2019.01) | |
| *B32B 25/04* | (2006.01) | |

(52) U.S. Cl.
CPC .......... *A43B 13/127* (2013.01); *A43B 13/143* (2013.01); *A43B 13/148* (2013.01); *A43B 13/186* (2013.01); *A43B 13/187* (2013.01); *A43B 13/20* (2013.01); *A43B 17/14* (2013.01); *B32B 3/263* (2013.01); *B32B 3/30* (2013.01); *B32B 5/18* (2013.01); *B32B 5/32* (2013.01); *B32B 7/02* (2013.01); *B32B 25/045* (2013.01); *B32B 2307/536* (2013.01); *B32B 2437/02* (2013.01)

(56) References Cited

U.S. PATENT DOCUMENTS

| | | | | |
|---|---|---|---|---|
| 4,030,213 | A * | 6/1977 | Daswick | A43B 5/06 36/30 R |
| 4,224,747 | A * | 9/1980 | Winfield | A43B 3/14 12/142 MC |
| 4,237,627 | A * | 12/1980 | Turner | A43B 5/06 36/129 |
| 4,265,033 | A * | 5/1981 | Pols | A43B 7/00 36/110 |
| RE31,173 | E * | 3/1983 | Daswick | A43B 5/06 36/103 |
| 4,413,429 | A * | 11/1983 | Power | A43B 17/003 36/30 R |
| 4,624,061 | A * | 11/1986 | Wezel | A43B 5/06 36/102 |
| 4,633,598 | A * | 1/1987 | Moronaga | A43B 5/00 36/44 |
| 4,757,620 | A * | 7/1988 | Tiitola | A43B 13/145 36/28 |
| 4,794,707 | A * | 1/1989 | Franklin | A43B 7/14 36/107 |
| 4,930,232 | A * | 6/1990 | Engle | A43B 13/12 36/44 |
| 5,077,915 | A * | 1/1992 | Gross | A43B 13/12 36/114 |
| 5,179,791 | A * | 1/1993 | Lain | A43B 13/41 36/144 |
| 5,579,591 | A * | 12/1996 | Kousaka | A43B 7/14 36/25 R |
| 5,592,757 | A * | 1/1997 | Jackinsky | A43B 13/12 36/114 |
| 6,775,930 | B2 * | 8/2004 | Fuerst | A43B 13/026 12/146 B |
| 6,782,639 | B1 * | 8/2004 | Muller | A43B 13/12 36/28 |
| 6,785,984 | B2 * | 9/2004 | Jackinsky | A43B 13/181 36/102 |
| 7,287,340 | B2 * | 10/2007 | Talbott | A43B 5/06 36/114 |
| 8,881,428 | B2 | 11/2014 | Mackey et al. | |
| 9,439,810 | B2 * | 9/2016 | Stilwell | A61F 13/064 |
| 10,285,470 | B2 * | 5/2019 | Morag | A43B 7/141 |
| 2003/0033732 | A1 | 2/2003 | Jackinsky | |
| 2005/0022425 | A1 * | 2/2005 | Brown | A43B 7/12 36/30 R |
| 2005/0138844 | A1 * | 6/2005 | Johnson | A43B 7/142 36/44 |
| 2008/0016724 | A1 * | 1/2008 | Hlavac | A43B 13/12 36/30 R |
| 2009/0288312 | A1 | 11/2009 | Dua | |
| 2011/0179669 | A1 * | 7/2011 | Hanebrink | A43B 7/144 36/28 |
| 2011/0225852 | A1 * | 9/2011 | Mahoney | A43B 13/12 36/30 R |
| 2012/0055041 | A1 * | 3/2012 | Mackey | A43B 7/141 36/28 |
| 2013/0047468 | A1 * | 2/2013 | Everett-Weber | A43B 3/108 36/87 |
| 2013/0074371 | A1 | 3/2013 | Borel et al. | |
| 2014/0290097 | A1 | 10/2014 | Bann | |
| 2014/0350446 | A1 * | 11/2014 | Gunnsteinsson | A61F 5/0111 602/27 |
| 2015/0068064 | A1 | 3/2015 | Morag et al. | |
| 2016/0015121 | A1 * | 1/2016 | Romo | A43B 17/023 36/92 |
| 2016/0242497 | A1 * | 8/2016 | Alviso | A43B 7/141 |
| 2016/0286895 | A1 * | 10/2016 | Burrows | A43B 17/006 |
| 2018/0184750 | A1 * | 7/2018 | Winger | A43B 17/006 |
| 2018/0255871 | A1 * | 9/2018 | Conway | A43B 13/14 |
| 2018/0295936 | A1 * | 10/2018 | Hansen | A43B 13/143 |

* cited by examiner

MIDSOLE, SOLE ASSEMBLY AND FOOTWEAR FOR WALKING AND RUNNING

CROSS REFERENCE TO RELATED APPLICATIONS

This application is a national stage application of international patent application no. PCT/US2016/048246, filed Aug. 23, 2016 and entitled "MIDSOLE, SOLE ASSEMBLY AND FOOTWEAR FOR WALKING AND RUNNING", naming Carmen Jackinsky as inventor, which claims the benefit of priority to U.S. Provisional Patent Application Ser. No. 62/210,596, filed Aug. 27, 2015 and entitled "MIDSOLE, SOLE ASSEMBLY AND FOOTWEAR FOR WALKING AND RUNNING," naming Carmen Jackinsky as inventor. The entire content of the patent applications is incorporated herein by reference, including all text, tables and drawings.

FIELD OF THE INVENTION

The present disclosure relates to an article of footwear and, more particularly, relates to a midsole and a sole assembly for an article of footwear with plural cushioning members for walking and running.

BACKGROUND OF THE INVENTION

Some athletes like to run. Some like to walk. Still others like to do a combination of the two activities, called a "run/walk" or the "Gallagher Method" which is a run/walk/run approach. While Walking and Running activities are both closed chain forward moving activities, their respective gaits have differences that promote unique footwear for their respective needs. For example, walkers maintain contact with the ground throughout each step, while runners propel themselves off the ground and then return with a greater force than a walker experiences with each foot contact. Walkers and Runners also exhibit different force measurements at the heel, midfoot and toe-off phases of their gait. Walkers prefer a low heeled shoe that supports a "heel toe" foot strike, while runners prefer more heel height to support the Achilles tendon and offer lateral stability for the ankle as the foot strikes the ground. Fast walkers need cushioning in the toe section because their greatest force comes when they propel off their toes into a forward motion. Runners like midfoot cushioning, too, but prefer a different percentage in relation to the heel cushioning than walkers. Current articles of footwear fail to provide a needed balance between walking and running preferences.

SUMMARY OF THE INVENTION

Disclosed herein, in certain embodiments, is a midsole defining a base support plane having a heel region, an arch region, a ball region, a toe region, an anterior portion adjacent the toe region, a posterior portion adjacent the heel region, and a longitudinal axis extending between the anterior portion adjacent the toe region and the posterior portion adjacent the heel region including a first cushioning member that extends along the longitudinal axis from the posterior portion adjacent the heel region to the ball region, a second cushioning member that extends along the longitudinal axis from the posterior portion adjacent the heel region to the anterior portion adjacent the toe region, and a third cushioning member that extends from the heel region to the anterior portion adjacent the toe region, wherein the height of the midsole provides a zero drop elevation. The third cushioning member can be more resilient than the first cushioning member. The first cushioning member can be more resilient than the second cushioning member. The first cushioning member can have an Asker durometer between about 30 and about 70. The second cushioning member 18 can have an Asker durometer between about 40 to about 90. The third cushioning member 19 can have an Asker durometer between about 15 to about 60.

A first thickness of the first cushioning member can decrease along the longitudinal axis from the posterior portion adjacent the heel region to the ball region. A second thickness of the second cushioning member can increase along the longitudinal axis from the posterior portion adjacent the heel region to the heel region. A third thickness of the second cushioning member can decrease along the longitudinal axis from the heel region to the toe region. A fourth thickness of the third cushioning member can increase along the longitudinal axis from the heel region to the ball region or to the toe region. A fifth thickness of the third cushioning member can decrease along the longitudinal axis from the ball region to the toe region. The third cushioning member can act as a fulcrum for the foot. The collective thicknesses of the first, second and third cushioning members can be a collective thickness between about 5 mm and about 25 mm. The first cushioning member 17 can have an acute angle 30 of about one degree to about ten degrees. The third cushioning member 19 can have an acute angle 35 of about six degrees to about fifteen degrees. The first cushioning member 17 can at least partially overlap and be on top of the second cushioning member 18. The second cushioning member 18 can at least partially overlap and be on top of the third cushioning member 19. At least one of the cushioning members can have a wedge shape. At least one of the cushioning members include foam, which can be deformable. At least one of the cushioning members can be removable.

The midsole can have a zero drop elevation from about 0 to about 4 mm.

Also provided herein is a footwear insert including any of the above midsole embodiments above with at least two of the cushioning members bonded together.

Also provided herein is a sole assembly including a midsole according to any of the embodiments above and an outsole. The outsole can include high-friction material, such as rubber and may include grooves or sipes.

Also provided herein is a sole assembly that includes an insole, which can be foam.

Also disclosed herein is an article of footwear including an upper and the sole assembly according to the above embodiments. Such footwear includes a shoe, a sandal or a boot.

Certain embodiments are described further in the following description, examples, claims and drawings.

BRIEF DESCRIPTION OF THE DRAWINGS

The drawings illustrate certain embodiments of the technology and are not limiting. For clarity and ease of illustration, the drawings are not made to scale and, in some instances, various aspects may be shown exaggerated or enlarged to facilitate an understanding of particular embodiments.

DETAILED DESCRIPTION OF THE INVENTION

Provided herein are midsoles, footwear inserts including midsoles, sole assemblies including midsoles and articles of footwear including midsoles suitable for walking or running without hindering the performance of either activity. The midsole provides a zero drop elevation. As used herein, a "zero drop" shoe refers to the difference in height from heel to toe. While not wishing to be held by theory, the heel section material depresses upon impact, allowing for proper support and cushioning for runners, while creating a lever for walkers to initiate forward momentum.

While not wishing to be held by theory, the disclosed midsole architecture provides dynamic variable resistance that improves performance by using different densities and angles of component midsole members that will allow the wearer to move through a full range of motion during walking or running with muscle effort remaining constant while shifting the workload from muscles that have limited power in certain positions, to those with more explosive and endurance capabilities in those same positions.

Figure 1:
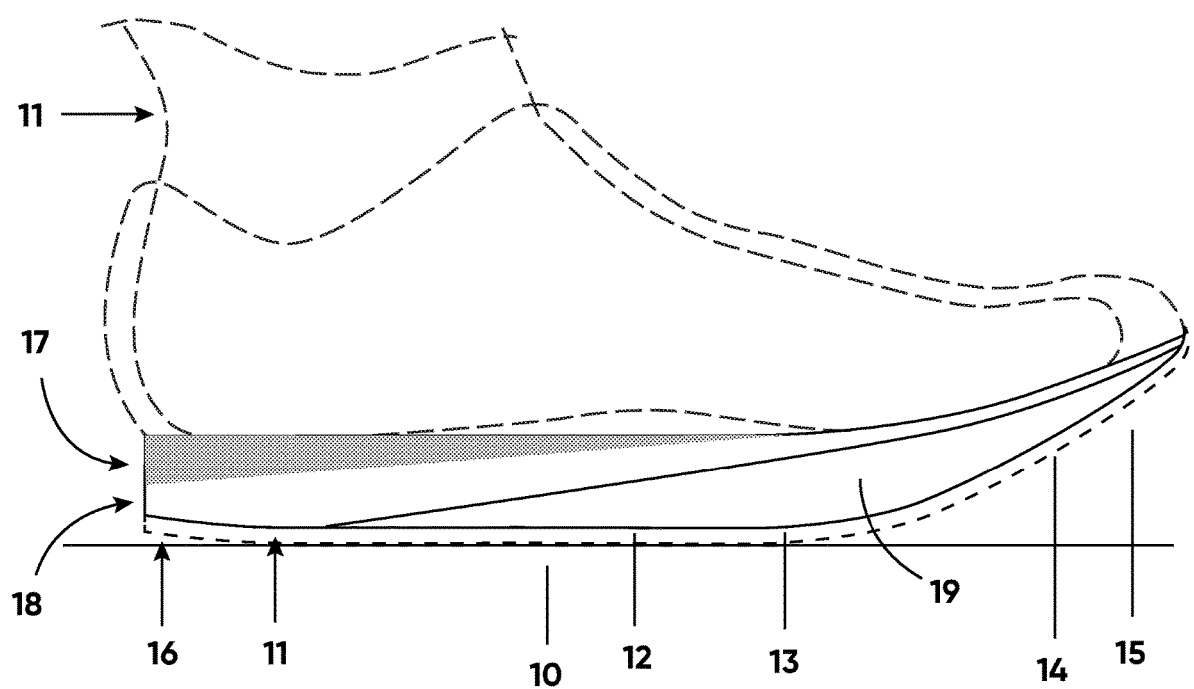
FIG. 1 shows a cross-sectional view of a midsole; and,
FIG. 2 shows a cross-sectional view of an article of footwear with a midsole.

Referring to FIG. 1 a midsole 10 is illustrated according to various exemplary embodiments of the present disclosure. The midsole defines a base support plane for a foot 11. In certain embodiments, the midsole includes a heel region 11, an arch region 12, a ball region 13 and a toe region 14, which roughly correspond with the structures of the foot when resting on top of the sole assembly. The midsole can include an anterior portion adjacent the toe region 15, a posterior portion adjacent the heel region 16, and a longitudinal axis extending between the anterior portion adjacent the toe region 15 and the posterior portion adjacent the heel region 16. The midsole 10 can include at least three cushioning members. A first cushioning member 17 can extend along the longitudinal axis from about the posterior portion adjacent the heel region 16 to about the ball region 13. A second cushioning member 18 can extend along the longitudinal axis from about the posterior portion adjacent the heel region 16 to about the anterior portion adjacent the toe region 15. A third cushioning member 19 can extend from about the heel region 11 to about the anterior portion adjacent the toe region 15. Unlike traditional shoes which have a 12-15 millimeter (mm) differential in height from heel to toe, a zero drop midsole has about a 0-4 mm differential in height from heel to toe. In some embodiments the heel to toe differential is 4 mm or less, 3 mm or less, 2 mm or less, 1 mm or less, or approximately zero mm.

The third cushioning member 19 can be more resilient than the first cushioning member 17. The first cushioning member 17 can be more resilient than the second cushioning member 18. Therefore, the third cushioning member 19 can be more easily resiliently deformed than the second cushioning member 18.

The first cushioning member 17 can have an Asker durometer that is between about 30 and about 70. All Asker durometer measurements provided herein relate to a Type C Asker durometer. The first cushioning member 17 can have an Asker durometer that is between about 40 and about 55. The first cushioning member 17 can have an Asker durometer that is less than about 70, less than about 65, less than about 60, less than about 55, less than about 50, less than about 45, less than about 40, or less than about 35. The first cushioning member can have an Asker durometer that is at least about 30, at least about 35, at least about 40, at least about 45, at least about 50, at least about 55, at least about 60, or at least about 65.

The second cushioning member 18 can have an Asker durometer of about 40 to about 90. The second cushioning member 18 can have an Asker durometer of about 50 to about 60. The second cushioning member 18 can have an Asker durometer that is less than about 90, less than about 85, less than about 80, less than about 75, less than about 70, less than about 65, less than about 60, less that about 55, less than about 50, or less than about 45. The second cushioning member 18 can have an Asker durometer that is at least about 40, at least about 45, at least about 50, at least about 55, at least about 60, at least about 65, at least about 70, at least about 75, at least about 80, or at least about 85.

The third cushioning member 19 can have an Asker durometer of about 15 to about 60. The third cushioning member 19 can have an Asker durometer of about 25 to about 40. The third cushioning member 19 can have an Asker durometer of less than about 60, less than about 55, less than about 50, less than about 45, less than about 40, less than about 35, less than about 30, less than about 25, or less than about 20. The third cushioning member 19 can have an Asker durometer of at least about 15, at least about 20, at least about 25, at least about 30, at lease about 35, at least about 40, at least about 45, at least about 50, or at least about 55.

The cushioning members can have thickness gradations along the longitudinal axis. A first thickness of the first cushioning member 17 can decrease along the longitudinal axis from the posterior portion adjacent the heel region 16 to the ball region 13. A second thickness of the second cushioning member 18 can increase from the posterior portion adjacent the heel region 16 to the heel region 11. A third thickness of the second cushioning member 18 can decrease along the longitudinal axis from the heel region 11 to the toe region 14. A fourth thickness of the third cushioning member 19 can increase along the longitudinal axis from the heel region 11 to the ball region 13 or to the toe region 12. A fifth thickness of the third cushioning 19 member can decrease along the longitudinal axis from the ball region 13 to the toe region 14.

In some embodiments, a collective thickness T of the first, second and third cushioning members, 17, 18, and 19, respectively, are between about 5 mm and about 25 mm. In suitable embodiments, the collective thickness T can be between about 18 mm and about 22 mm. In suitable embodiments, the collective thickness T can be about 20 mm. The collective thickness T can be at least about 5 mm, at least about 6 mm, at least about 7 mm, at least about 8 mm, at least about 9 mm, at least about 10 mm, at least about 11 mm, at least about 12 mm, at least about 13 mm, at least about 14 mm, at least about 15 mm, at least about 16 mm, at least about 17 mm, at least about 18 mm, at least about 19 mm, at least about 20 mm, at least about 21 mm, at least about 22 mm, at least about 23 mm, or at least about 24 mm. The collective thickness T can be less than about 24 mm, less than about 23 mm, less than about 22 mm, less than about 21 mm, less than about 20 mm, less than about 19 mm, less than about 18 mm, less than about 17 mm, less that about 16 mm, less than about 15 mm, less than about 14 mm, less than about 13 mm, less than about 12 mm, less than about 11 mm, less than about 10 mm, less than about 9 mm, less than about 8 mm, less than about 7 mm, or less than about 6 mm.

Figure 2:
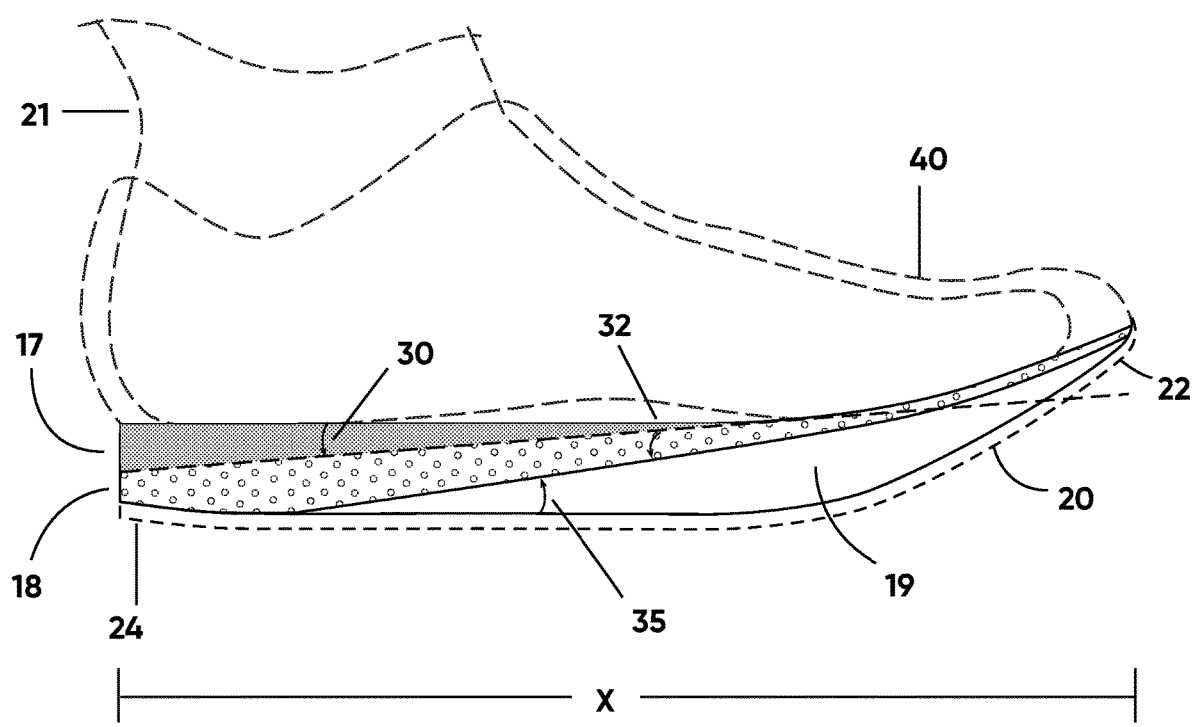

The cushioning members 17, 18, 19 can be characterized by an acute angle when viewed in cross-section (FIG. 2). The first cushioning member 17 can have an acute angle 30 of from about one degree to about 10 degrees. The first cushioning member 17 can have an acute angle of from about 4 degrees to about 6 degrees. The first cushioning member 17 can have an acute angle of about 5 degrees. The first cushioning member 17 can have an acute angle of at least about 1 degree, at least about 2 degrees, at least about 3 degrees, at least about 4 degrees, at least about 5 degrees, at least about 6 degrees, at least about 7 degrees, at least about 8 degrees, or at least about 9 degrees. The first cushioning member 17 can have an acute angle of less than about 10 degrees, less than about 9 degrees, less than about 8 degrees, less than about 7 degrees, less than about 6 degrees, less than about 5 degrees, less than about 4 degrees, less than about 3 degrees, or less than about 2 degrees. An acute angle 32 can be defined by the top edge of the first cushioning member and the bottom edge of the second cushioning member (see FIG. 2) of about 2 degrees and to about 10 degrees. The second cushioning member 18 can have an acute angle of about 5 degrees. The second cushioning member 18 can have an acute angle of at least 2 degrees, at least 3 degrees, at least 4 degrees, at least 5 degrees at least 6 degrees, at least 7 degrees, at least 8 degrees, or at least 9 degrees. The second cushioning member 18 can have an acute angle of less than about 10 degrees, less than about 9 degrees, less than about 8 degrees, less than about 7 degrees, less than about 6 degrees, less than about 5 degrees, less than about 4 degrees, or less than about 3 degrees. The third cushioning member 19 can have an acute angle 35 about 6 degrees to about 15 degrees. The third cushioning member 19 can have an acute angle 35 of about 10 degrees. The third cushioning member 19 can have an acute angle 35 of about 14 degrees. The third cushioning member 19 can have an acute angle 35 of at least about 6 degrees, at least about 7 degrees, at least about 8 degrees, at least about 9 degrees, at least about 10 degrees, at least about 11 degrees, at least about 12 degrees, at least about 13 degrees, or at least about 14 degrees. The third cushioning member 19 can have an acute angle 35 of less than about 15 degrees, less than about 14 degrees, less than about 13 degrees, less than about 12 degrees, less than about 11 degrees, less than about 10 degrees, less than about 9 degrees, less than about 8 degrees, or less than about 7 degrees. The acute angle of the second cushioning member 18 can be defined by the acute angles and relative thickness of the first and third cushioning members (see FIG. 2) and the zero drop height of the midsole.

The first cushioning member 17 can act as a support for the wearer's heel. Upon contact, it will depress sufficiently to support the wearer's Achilles tendon, while providing cushioning for the wearer's heel. This material can also have a resilience property that will depress sufficiently to create a low angled foot posture for a walker's gait at contact.

The second cushioning member 18 can act as a lever for the foot. As the wearer's foot shifts into a prone posture, the midsole shifts as well to support that motion. The material can provide minimal resilience, allowing for a quick response time between the wearer's foot and the ground. The resilience of cushioning member 18 allows the wearer to use an increased area of the foot in order to drive forward, in a similar fashion as a long lever would be used to pivot a heavy object. The result is less force needed by the foot on each stride. The density of the material can provide further lateral stability and even load distribution in the ball region of the foot. In suitable embodiments, cushioning member 18 works together with cushioning member 19 to create a spring-effect to propel the wearer in the forward motion in a more advantageous angle at the toe-off phase of running or walking.

The third cushioning member 19 can act as a fulcrum for the foot. The midsole 10 can define a fulcrum or pivot generally below the ball of the wearer's foot, accommodating forward roll of the foot from the planted orientation to the push-off orientation as disclosed in U.S. Pat. No. 5,592,757 to Jackinsky, incorporated herein by reference.

The first, second and third cushioning members, 17, 18, 19, respectively, can be made out of any suitable material, such as resiliently deformable foam, and can be formed in any suitable shape, such as respective wedge shapes that overlap each other. In some embodiments, the foam can be thermoplastic synthetic resin foam such as ethylene-vinyl acetate copolymer (EVA), thermosetting resin foam such as polyurethane (PU), or rubber material foam such as butadiene or chloroprene rubber. Moreover, in some embodiments, the midsole 10 can include fluid filled bladders (not shown) for providing cushioned support.

The midsole 10 can be used as a footwear insert, wherein at least two of the cushions are bonded to allow a user to place the insert in an article of footwear that can accommodate the insert. In some embodiments, all parts of the midsole are bonded. Cushions can be bonded together using waterproof glue or other suitable bonding material. In other embodiments the midsole 10 can be used in combination with a standard insole (not shown) and outsole 20 that define the unique profile of the shoe. The heel region, arch region, ball region and toe regions usually extend from the insole to the outsole 20. Some of the forward sections, such as those nearest the front of the shoe (FIG. 1, 15 in embodiment shown), may extend from an area of the outsole 20 to another area of the outsole 20, with a terminal forward section (such as 15) typically collaterally disposed relative the outsole 20. The midsole's 10 profile generally is consistent across the shoe's width and is characterized by a thickness, which can be a zero drop. The sole's thickness decreases arcuately in the forward direction from the part of the sole underlying the ball of the foot to the forward terminus of the sole.

As shown in FIG. 1, the heel region can include cushioning members 17 and 18. In some embodiments, the heel region may be a single integrated section, or the heel region may alternatively be further divided into additional sections.

The shoe's forward sections constitute a front portion with a generally forwardly-decreasing thickness, collectively tapering arcuately to termination at the forward end of the shoe. This arrangement creates a dynamic midsole in combination with cushioning member 18 wherein the wearer's foot posture pivots to a forward position where effective muscle force is greater, allowing for improved push-off power. The density of third cushioning member 19 offers a resiliency that depresses enough to create a decrease in resistance force of the foot at toe off, thereby reducing friction. Less friction produces the ability for a wearer to increase stride frequency and thereby speed.

As shown in FIG. 1, the front portion of the midsole includes one single density, however, a front portion of the midsole with multiple densities is within the scope of the invention. In some embodiments, a single forward section with an internally-graduating density may be used, alone or in combination with other forward sections. The forward sections are shown in FIG. 1 collaterally disposed in an oblique orientation relative the ground. The arcuate expanse extends between the second load-bearing area, generally under the ball of the foot, and the forward terminus of the midsole. The midsole thus defines a fulcrum or pivot generally below the ball of the wearer's foot, accommodating forward roll of the foot from the planted orientation (shown in FIG. 1) to the push-off orientation as disclosed in U.S. Pat. No. 5,592,757 to Jackinsky, incorporated herein by reference. The arcuate expanse underlies that portion of the foot which is used to push-off during walking.

In various embodiments, a sole assembly can include a midsole 10 as disclosed above and an outsole 20.

In various embodiments, a sole assembly can further include an insole (not shown), which is substantially flat and thin and which substantially conforms to the lower portion of the foot 11 of the wearer to provide cushioning and arch support. The insole can be made out of any suitable material, such as a thin foam material.

Referring to FIG. 2, an article of footwear 20 is illustrated according to various exemplary embodiments of the present disclosure. The article of footwear 20 can fit about and support a foot 21 of a wearer (shown in phantom). The article of footwear 20 can define an anterior portion 22 and a posterior portion 24. Also, the footwear 20 can have a longitudinal axis X extending between the anterior and posterior portions 22, 24. As shown, the footwear 20 can be a shoe (e.g., an athletic shoe); however, it will be appreciated that the footwear 20 could be of any suitable type other than a shoe, such as a sandal, boot, and the like without departing from the scope of the present disclosure. In some embodiments, the heel of the article of footwear extends to the posterior portion of the heel, creating a corner edge. In some embodiments, the heel is beveled to create a rounded edge.

The sole assembly (not shown) can generally include an outsole 20 and a midsole 10. Both the outsole and midsole 20, 10 can be operably coupled to the upper 40. More specifically, the midsole 10 can be disposed between the outsole 20 and the upper 40. Generally, the outsole 20 can include one or more pieces of high-friction material, such as rubber, and can include various grooves, sipes, or other features for improving traction of the footwear 20.

In some embodiments, the cushioning members 17, 18, 19 can be removable and replaceable with respect to the other portions of the footwear 20. For instance, the wearer can remove and replace one, two or all of the cushioning members 17, 18, 19 for various reasons (e.g., to change the stiffness or resilience of the cushioning member(s) 17, 18, 19). Accordingly, the footwear 20 can be modular and can be adapted according to the desires of the wearer.

The article of footwear can include structures to increase lateral stability, for example, by the incorporation sidewall strips. Other structures for increasing lateral stability are known to those skilled in the art.

The upper 40 can include one or more panels that are interconnected to define a cavity that receives the foot 11 of the wearer. Also, the upper 40 can include laces, buckles, pile tape, or other suitable types of means of securing the upper 40 to the foot 11.

Provided below are exemplary embodiments

A1. A midsole defining a base support plane having a heel region, an arch region, a ball region, a toe region, an anterior portion adjacent the toe region, a posterior portion adjacent the heel region, and a longitudinal axis extending between the anterior portion adjacent the toe region and the posterior portion adjacent the heel region comprising:
- a first cushioning member that extends along the longitudinal axis from the posterior portion adjacent the heel region to the ball region;
- a second cushioning member that extends along the longitudinal axis from the posterior portion adjacent the heel region to the anterior portion adjacent the toe region;
- a third cushioning member that extends from the heel region to the anterior portion adjacent the toe region;
- wherein the midsole comprises a zero drop elevation.

A2. The midsole according to embodiment A1, wherein the third cushioning member is more resilient than the first cushioning member.

A3. The midsole according to any of the embodiments A1 to A2, wherein the first cushioning member is more resilient than the second cushioning member.

A4. The midsole according to any of the embodiments A1 to A3, wherein the first cushioning member 17 comprises an Asker durometer between about 30 and about 70.

A5. The midsole according to any of the embodiments A1 to A3, wherein the first cushioning member 17 comprises an Asker durometer that is between about 40 and about 55.

A6. The midsole according to any of the embodiments A1 to A3, wherein the first cushioning member 17 comprises an Asker durometer that is less than about 70, less than about 65, less than about 60, less than about 55, less than about 50, less than about 45, less than about 40, or less than about 35.

A7. The midsole according to any of the embodiments A1 to A3, wherein the first cushioning member 17 comprises an Asker durometer that is at least about 30, at least about 35, at least about 40, at least about 45, at least about 50, at least about 55, at least about 60, or at least about 65.

A8. The midsole according to any of the embodiments A1 to A7, wherein the second cushioning member 18 comprises an Asker durometer between about 40 to about 90.

A9. The midsole according to any of the embodiments A1 to A7, wherein the second cushioning member 18 comprises an Asker durometer between about 50 to about 60.

A10. The midsole according to any of the embodiments A1 to A7, wherein the second cushioning member 18 comprises an Asker durometer less than about 90, less than about 85, less than about 80, less than about 75, less than about 70, less than about 65, less than about 60, less that about 55, less than about 50, less than about 45.

A11. The midsole according to any of the embodiments A1 to A7, wherein the second cushioning member 18 comprises an Asker durometer at least about 40, at least about 45, at least about 50, at least about 55, at least about 60, at least about 65, at least about 70, at least about 75, at least about 80, or at least about 85.

A12. The midsole according to any of the embodiments A1 to A11, wherein the third cushioning member 19 comprises an Asker durometer between about 15 to about 60.

A13. The midsole according to any of the embodiments A1 to A11, wherein the third cushioning member 19 comprises an Asker durometer between about 25 to about 40.

A14. The midsole according to any of the embodiments A1 to A11, wherein the third cushioning member 19 comprises an Asker durometer less than about 60, less than about 55, less than about 50, less than about 45, less than about 40, less than about 35, less than about 30, less than about 25, or less than about 20.

A15. The midsole according to any of the embodiments A1 to A11, wherein the third cushioning member 19 comprises an Asker durometer at least about 15, at least about 20, at least about 25, at least about 30, at least about 35, at least about 40, at least about 45, at least about 50, or at least about 55.

A16. The midsole according to any of the embodiments A1 to A15, wherein a first thickness of the first cushioning member 17 decreases along the longitudinal axis from the posterior portion adjacent the heel region to the arch region.

A17. The midsole according to any of the embodiments A1 to A16, wherein a second thickness of the second cushioning member 18 increases along the longitudinal axis from the posterior portion adjacent the heel region to the heel region.

A18. The midsole according to any of the embodiments A1 to A17, wherein a third thickness of the second cushioning member 18 decreases along the longitudinal axis from the heel region to the toe region.

A19. The midsole according to any of the embodiments A1 to A18, wherein a fourth thickness of the third cushioning member 19 increases along the longitudinal axis from the heel region to the ball region.

A20. The midsole according to any of the embodiments A1 to A18, wherein a fourth thickness of the third cushioning member 19 increases along the longitudinal axis from the heel region to the toe region.

A21. The midsole according to any of the embodiments A1 to A19, wherein a fifth thickness of the third cushioning member 19 decreases along the longitudinal axis from the ball region to the toe region.

A22. The midsole according to any of the embodiments A1 to A21, wherein the first, second and third cushioning members comprise a collective thickness between about 5 mm and about 25 mm.

A23. The midsole according to any of the embodiments A1 to A21, wherein the first, second and third cushioning members comprise a collective thickness between about 18 mm and about 20 mm.

A24. The midsole according to any of the embodiments A1 to A21, wherein the first, second and third cushioning members comprise a collective thickness less than about 24 mm, less than about 23 mm, less than about 22 mm, less than about 21 mm, less than about 20 mm, less than about 19 mm, less than about 18 mm, less than about 17 mm, less that about 16 mm, less than about 15 mm, less than about 14 mm, less than about 13 mm, less than about 12 mm, less than about 11 mm, less than about 10 mm, less than about 9 mm, less than about 8 mm, less than about 7 mm, or less than about 6 mm.

A25. The midsole according to any of the embodiments A1 to A21, wherein the first, second and third cushioning members comprise a collective thickness at least about 5 mm, at least about 6 mm, at least about 7 mm, at least about 8 mm, at least about 9 mm, at least about 10 mm, at least about 11 mm, at least about 12 mm, at least about 13 mm, at least about 14 mm, at least about 15 mm, at least about 16 mm, at least about 17 mm, at least about 18 mm, at least about 19 mm, at least about 20 mm, at least about 21 mm, at least about 22 mm, at least about 23 mm, or at least about 24 mm.

A26. The midsole according to any of the embodiments A1 to A25, wherein the second cushioning member 18 comprises an acute angle 32 of about two degrees to about ten degrees.

A27. The midsole according to any of the embodiments A1 to A25, wherein the second cushioning member 18 comprises an acute angle 32 of about five degrees.

A28. The midsole according to any of the embodiments A1 to A25, wherein the second cushioning member 18 comprises an acute angle 32 of at least about 2 degrees, at least about 3 degrees, at least about 4 degrees, at least about 5 degrees, at least about 6 degrees, at least about 7 degrees, at least about 8 degrees, or at least about 9 degrees.

A29. The midsole according to any of the embodiments A1 to A25, wherein the second cushioning member 18 comprises an acute angle 32 of less than about 10 degrees, less than about 9 degrees, less than about 8 degrees, less than about 7 degrees, less than about 6 degrees, less than about 5 degrees, less than about 4 degrees, or less than about 3 degrees.

A30. The midsole according to any of the embodiments A1 to A29, wherein the first cushioning member 17 comprises an acute angle 30 of about one degree to about ten degrees.

A31. The midsole according to any of the embodiments A1 to A29, wherein the first cushioning member 17 comprises an acute angle 30 of about four degrees to about six degrees.

A32. The midsole according to any of the embodiments A1 to A29, wherein the first cushioning member 17 comprises an acute angle 30 of about five degrees.

A33. The midsole according to any of the embodiments A1 to A29, wherein the first cushioning member 17 comprises an acute angle 30 of at least about 1 degree, at least about 2 degrees, at least about 3 degrees, at least about 4 degrees, at least about 5 degrees, at least about 6 degrees, at least about 7 degrees, at least about 8 degrees, or at least about 9 degrees.

A34. The midsole according to any of the embodiments A1 to A29, wherein the first cushioning member 17 comprises an acute angle 30 of less than about 10 degrees, less than about 9 degrees, less than about 8 degrees, less than about 7 degrees, less than about 6 degrees, less than about 5 degrees, less than about 4 degrees, less than about 3 degrees, or less than about 2 degrees.

A35. The midsole according to any of the embodiments A1 to A34, wherein the third cushioning member 19 comprises an acute angle 35 of about six degrees to about fifteen degrees.

A36. The midsole according to any of the embodiments A1 to A34, wherein the third cushioning member 19 comprises an acute angle 35 of about ten degrees.

A37. The midsole according to any of the embodiments A1 to A34, wherein the third cushioning member 19 comprises an acute angle 35 of at least about 6 degrees, at least about 7 degrees, at least about 8 degrees, at least about 9 degrees, at least about 10 degrees, at least about 11 degrees, at least about 12 degrees, at least about 13 degrees, or at least about 14 degrees.

A38. The midsole according to any of the embodiments A1 to A34, wherein the third cushioning member 19 comprises an acute angle 35 of less than about 15 degrees, less than about 14 degrees, less than about 13 degrees, less than about 12 degrees, less than about 11 degrees, less than about 10 degrees, less than about 9 degrees, less than about 8 degrees, or less than about 7 degrees.

A39. The midsole according to any of the embodiments A1 to A38, wherein the first cushioning member 17 at least partially overlaps and is on top of the second cushioning member 18.

A40. The midsole according to any of the embodiments A1 to A38, wherein the second cushioning member 18 at least partially overlaps and is on top of the third cushioning member 19.

A41 The midsole according to any of the embodiments A1 to A40, wherein at least one of the cushioning members comprises a wedge shape.

A42 The midsole according to any of the embodiments A1 to A41, wherein at least one of the cushioning members comprises a foam.

A43 The midsole according to any of the embodiments A1 to A41, wherein at least one of the cushioning members comprises a resiliently deformable foam.

A44 The midsole according to any of the embodiments A1 to A43, further comprising a fluid filled bladder.

A45 The midsole according to any of the embodiments A1 to A44, wherein at least one of the cushioning members is removable.

A46. The midsole according to any of the embodiments A1 to A45, comprising a zero drop elevation from about 0 to about 4 mm.

A47. The midsole according to any of the embodiments A1 to A45, comprising a zero drop elevation of 4 mm or less, 3 mm or less, 2 mm or less, or 1 mm or less.

A48. The midsole according to any of the embodiments A1 to A45, comprising a zero drop elevation of about 0 mm.

B1. A sole assembly comprising a midsole according to any of the embodiments A1 to A43 and an outsole 20.

B2. A sole assembly according to embodiment B1, wherein the outsole 20 comprises one or more pieces of high-friction material.

B2. A sole assembly according to embodiment B1, wherein the outsole 20 comprises one or more pieces of rubber.

B3. A sole assembly according to embodiment B1, wherein the outsole 20 comprises grooves, sipes, or other features for improving traction.

B4. A sole assembly according to any of the embodiments B1 to B3, further comprising a an insole.

B5. The sole assembly according to embodiment B4, wherein the insole comprises a foam material.

C1. An article of footwear comprising a sole assembly according to embodiment B1 to B5 operably coupled to an upper 40.

C2. The article of footwear according to embodiment C1, wherein the first cushioning member 17 can provide support for a wearer's heel.

C3. The article of footwear according to embodiment C2, wherein the first cushioning member 17 can depress sufficiently to support the wearer's Achilles tendon, while providing cushioning for the wearer's heel.

C4. The article of footwear according to any of the embodiments C1 to C3, wherein the second cushioning member 18 can act as a lever for a wearer's foot.

C5. The article of footwear according to any of the embodiments C1 to C4, wherein cushioning member 18 works together with cushioning member 19 to create a spring-effect to propel the wearer in a forward motion in a more advantageous angle at a toe-off phase of running or walking.

C6. The article of footwear according to any of the embodiments C1 to C5, wherein the third cushioning member 19 can act as a fulcrum for a wearer's foot.

C7. The article of footwear according to any of the embodiments C1 to C6, wherein forward sections of the midsole constitute a front portion with a generally forwardly-decreasing thickness, collectively tapering arcuately to termination at the forward end of the footwear.

C8. The article of footwear according to any of the embodiments C1 to C7, comprising a shoe, a sandal or a boot.

C9. The article of footwear according to any of the embodiments C1 to C8, comprising a structure that increases sidewall stability.

C10. The article of footwear according to embodiment C9, wherein the structure comprises sidewall strips.

C11. The article of footwear according to any of the embodiments C1 to C10, comprising one or more interconnected panels to define a cavity that receives a foot 11 of a wearer.

C12. The article of footwear according to any of the embodiments C1 to C11, wherein the heel comprises a corner edge.

C13. The article of footwear according to any of the embodiments C1 to C11, wherein the heel comprises a beveled edge.

D1. A footwear insert comprising a midsole according to any of the embodiments A1 to A48, wherein at least two of the cushioning members are bonded together.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Their citation is not an indication of a search for relevant disclosures. All statements regarding the date(s) or contents of the documents is based on available information and is not an admission as to their accuracy or correctness.

Modifications may be made to the foregoing without departing from the basic aspects of the technology. Although the technology has been described in substantial detail with reference to one or more specific embodiments, those of ordinary skill in the art will recognize that changes may be made to the embodiments specifically disclosed in this application, yet these modifications and improvements are within the scope and spirit of the technology.

The technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the technology claimed. The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 10%), and use of the term "about" at the beginning of a string of values modifies each of the values (i.e., "about 1, 2 and 3" refers to about 1, about 2 and about 3). For example, a weight of "about 100 grams" can include weights between 90 grams and 110 grams. Further, when a listing of values is described herein (e.g., about 50%, 60%, 70%, 80%, 85% or 86%) the listing includes all intermediate and fractional values thereof (e.g., 54%, 85.4%). Thus, it should be understood that although the present technology has been specifically disclosed by representative embodiments and optional features, modification and variation of the concepts herein disclosed may be resorted to by those skilled in the art, and such modifications and variations are considered within the scope of this technology.

Certain embodiments of the technology are set forth in the claim(s) that follow(s).

The above disclosure is intended only to convey an understanding of the present invention to those skilled in the art, and is not intended to be limiting. It will be appreciated that various modifications to the disclosed embodiments are possible without departing from the scope of the invention. Therefore, the scope of the present invention should be construed solely by reference to the appended claims.

It is claimed:

1. A midsole defining a base support plane having a heel region, an arch region, a ball region, a toe region, an anterior portion adjacent the toe region, a posterior portion adjacent the heel region, and a longitudinal axis extending between the anterior portion adjacent the toe region and the posterior portion adjacent the heel region comprising:
a first cushioning member that extends along the longitudinal axis from the posterior portion adjacent the heel region to the ball region, wherein a first thickness of the first cushioning member (17) decreases along the longitudinal axis from the posterior portion adjacent the heel region to the ball region;
a second cushioning member that extends along the longitudinal axis from the posterior portion adjacent the heel region to the anterior portion adjacent the toe region;
a third cushioning member that extends from the heel region to the anterior portion adjacent the toe region;
wherein the midsole comprises a 0-4 mm differential in height from heel to toe.

2. The midsole according to claim 1, wherein the third cushioning member is more resilient than the first cushioning member.

3. The midsole according to claim 1, wherein the first cushioning member is more resilient than the second cushioning member.

4. The midsole according to claim 1, wherein the first cushioning member (17) comprises an Asker durometer between about 30 and about 70.

5. The midsole according to claim 1, wherein the first cushioning member (17) comprises an Asker durometer that is between about 40 and about 55.

6. The midsole according to claim 1, wherein the second cushioning member (18) comprises an Asker durometer between about 40 to about 90.

7. The midsole according to claim 1, wherein the second cushioning member (18) comprises an Asker durometer less than about 80.

8. The midsole according to claim 1, wherein the third cushioning member (19) comprises an Asker durometer between about 15 to about 60.

9. The midsole according to claim 1, wherein the third cushioning member (19) comprises an Asker durometer between about 25 to about 40.

10. The midsole according to claim 1, wherein a second thickness of the second cushioning member (18) increases along the longitudinal axis from the posterior portion adjacent the heel region to the heel region.

11. The midsole according to claim 1, wherein a third thickness of the second cushioning member (18) decreases along the longitudinal axis from the heel region to the toe region.

12. The midsole according to claim 1, wherein a fourth thickness of the third cushioning member (19) increases along the longitudinal axis from the heel region to the ball region.

13. The midsole according to claim 1, wherein a fourth thickness of the third cushioning member (19) increases along the longitudinal axis from the heel region to the toe region.

14. The midsole according to claim 1, wherein a fifth thickness of the third cushioning member (19) decreases along the longitudinal axis from the ball region to the toe region.

15. The midsole according to claim 1, wherein the midsole comprises a collective thickness between about 5 mm and about 25 mm.

16. The midsole according to claim 1, wherein the second cushioning member (18) comprises an acute angle (32) of about two degrees to about ten degrees.

17. The midsole according to claim 1, wherein the first cushioning member (17) comprises an acute angle (30) of about one degree to about ten degrees.

18. The midsole according to claim 1, wherein the third cushioning member (19) comprises an acute angle (35) of about six degrees to about fifteen degrees.

19. A midsole defining a base support plane having a heel region, an arch region, a ball region, a toe region, an anterior portion adjacent the toe region, a posterior portion adjacent the heel region, and a longitudinal axis extending between the anterior portion adjacent the toe region and the posterior portion adjacent the heel region comprising:
a first cushioning member that extends along the longitudinal axis from the posterior portion adjacent the heel region to the ball region;
a second cushioning member that extends along the longitudinal axis from the posterior portion adjacent the heel region to the anterior portion adjacent the toe region, wherein a third thickness of the second cushioning member (18) decreases along the longitudinal axis from the heel region to the toe region;
a third cushioning member that extends from the heel region to the anterior portion adjacent the toe region;
wherein the midsole comprises a 0-4 mm differential in height from heel to toe.

20. The midsole according to claim 19, wherein the third cushioning member is more resilient than the first cushioning member.

21. The midsole according to claim 19, wherein the first cushioning member is more resilient than the second cushioning member.

22. The midsole according to claim 19, wherein the first cushioning member (17) comprises an Asker durometer between about 30 and about 70.

23. The midsole according to claim 19, wherein the first cushioning member (17) comprises an Asker durometer that is between about 40 and about 55.

24. The midsole according to claim 19, wherein the second cushioning member (18) comprises an Asker durometer between about 40 to about 90.

25. The midsole according to claim 19, wherein the second cushioning member (18) comprises an Asker durometer less than about 80.

26. The midsole according to claim 19, wherein the third cushioning member (19) comprises an Asker durometer between about 15 to about 60.

27. The midsole according to claim 19, wherein the third cushioning member (19) comprises an Asker durometer between about 25 to about 40.

28. The midsole according to claim 19, wherein a second thickness of the second cushioning member (18) increases along the longitudinal axis from the posterior portion adjacent the heel region to the heel region.

29. The midsole according to claim 19, wherein a fourth thickness of the third cushioning member (19) increases along the longitudinal axis from the heel region to the ball region.

30. The midsole according to claim 19, wherein a fourth thickness of the third cushioning member (19) increases along the longitudinal axis from the heel region to the toe region.

31. The midsole according to claim 19, wherein a fifth thickness of the third cushioning member (19) decreases along the longitudinal axis from the ball region to the toe region.

32. The midsole according to claim 19, wherein the midsole comprises a collective thickness between about 5 mm and about 25 mm.

33. The midsole according to claim 19, wherein the second cushioning member (18) comprises an acute angle (32) of about two degrees to about ten degrees.

34. The midsole according to claim 19, wherein the first cushioning member (17) comprises an acute angle (30) of about one degree to about ten degrees.

35. The midsole according to claim 19, wherein the third cushioning member (19) comprises an acute angle (35) of about six degrees to about fifteen degrees.

36. A midsole defining a base support plane having a heel region, an arch region, a ball region, a toe region, an anterior portion adjacent the toe region, a posterior portion adjacent the heel region, and a longitudinal axis extending between the anterior portion adjacent the toe region and the posterior portion adjacent the heel region comprising:
   a first cushioning member that extends along the longitudinal axis from the posterior portion adjacent the heel region to the ball region;
   a second cushioning member that extends along the longitudinal axis from the posterior portion adjacent the heel region to the anterior portion adjacent the toe region, wherein the second cushioning member (18) comprises an acute angle (32) of about two degrees to about ten degrees;
   a third cushioning member that extends from the heel region to the anterior portion adjacent the toe region;
   wherein the midsole comprises a 0-4 mm differential in height from heel to toe.

37. The midsole according to claim 36, wherein the third cushioning member is more resilient than the first cushioning member.

38. The midsole according to claim 36, wherein the first cushioning member is more resilient than the second cushioning member.

39. The midsole according to claim 36, wherein the first cushioning member (17) comprises an Asker durometer between about 30 and about 70.

40. The midsole according to claim 36, wherein the first cushioning member (17) comprises an Asker durometer that is between about 40 and about 55.

41. The midsole according to claim 36, wherein the second cushioning member (18) comprises an Asker durometer between about 40 to about 90.

42. The midsole according to claim 36, wherein the second cushioning member (18) comprises an Asker durometer less than about 80.

43. The midsole according to claim 36, wherein the third cushioning member (19) comprises an Asker durometer between about 15 to about 60.

44. The midsole according to claim 36, wherein the third cushioning member (19) comprises an Asker durometer between about 25 to about 40.

45. The midsole according to claim 36, wherein a second thickness of the second cushioning member (18) increases along the longitudinal axis from the posterior portion adjacent the heel region to the heel region.

46. The midsole according to claim 36, wherein a fourth thickness of the third cushioning member (19) increases along the longitudinal axis from the heel region to the ball region.

47. The midsole according to claim 36, wherein a fourth thickness of the third cushioning member (19) increases along the longitudinal axis from the heel region to the toe region.

48. The midsole according to claim 36, wherein a fifth thickness of the third cushioning member (19) decreases along the longitudinal axis from the ball region to the toe region.

49. The midsole according to claim 36, wherein the midsole comprises a collective thickness between about 5 mm and about 25 mm.

50. The midsole according to claim 36, wherein the first cushioning member (17) comprises an acute angle (30) of about one degree to about ten degrees.

51. The midsole according to claim 36, wherein the third cushioning member (19) comprises an acute angle (35) of about six degrees to about fifteen degrees.

* * * * *